July 19, 1966   J. C. JUREIT   3,261,137
FASTENER

Filed Dec. 28, 1962   2 Sheets-Sheet 1

INVENTOR.
JOHN C. JUREIT
BY
*Le Blanc and Shur*
ATTORNEYS.

July 19, 1966  J. C. JUREIT  3,261,137
FASTENER

Filed Dec. 28, 1962  2 Sheets-Sheet 2

INVENTOR.
JOHN C. JUREIT
BY *Le Blanc and Shur*
ATTORNEYS.

United States Patent Office 3,261,137
Patented July 19, 1966

3,261,137
FASTENER
John C. Jureit, Miami, Fla., assignor to Automated Building Components, Inc., Miami, Fla., a corporation of Florida
Filed Dec. 28, 1962, Ser. No. 248,151
7 Claims. (Cl. 52—483)

This invention relates to connecting devices and more particularly relates to hidden fasteners for attaching wallboard to studding and other uses.

The problem of attaching wallboard to studding in residential housing has been the genesis of a large number of proposals for widely varying types of hidden fasteners as is attested to by the volume of patent literature available on this subject. While certain of these devices have achieved at least limited commercial usage, by far the majority of wallboard is now attached to studding by the relatively old process of simply nailing and then touching up the nail holes with spackling material of one sort or another. This failure of the building industry to adopt any of these prior fasteners to any marked extent is in itself testimony to the fact that prior fasteners, while operative, suffer from one or another disadvantages.

According to the present invention, it has now been found that it is possible to provide unique types of hidden fasteners which overcome the disadvantages of prior devices and which permit rapid and efficient mounting of wallboard on studding either on the site or in prefabrication operations. The joint between the wallboards and studding which are formed by the fasteners of this invention possess a strength on the same order as the older nailed joints but eliminate the necessity for hiding the nail holes through the application of spackling material. In addition, the hidden fasteners of the invention are low in cost and adapt themselves to a variety of uses in addition to attaching wallboard to studding.

It is, accordingly, a primary object of the present invention to provide an improved type of hidden fastener for forming lap-type joints.

It is another object of the invention to provide an improved hidden fastener for forming lap joints which may be used for attaching wallboard to studding and which may also be used in a number of other different lap joint environments.

It is another object of the invention to provide an improved hidden fastener which is economical and which may be applied either on the site of residential housing construction or at prefabrication centers.

It is still a further object of the invention to provide an improved hidden fastener which possesses a high withdrawal resistance even in paneling of relatively thin thickness.

It is still a further object of the invention to provide improved hidden fasteners which may be utilized in strip form in prefabrication operations and also in on-the-site construction.

These and further objects and advantages of the invention will become more apparent upon reference to the following specifications and claims and the appended drawings wherein:

Figure 1:
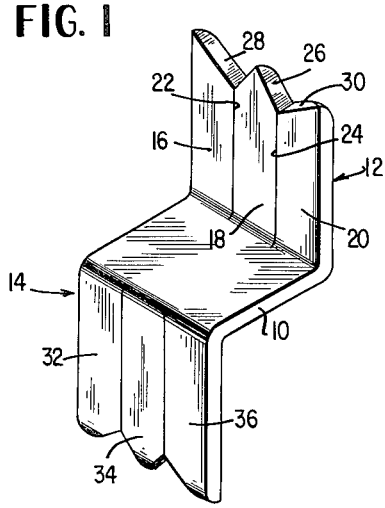
FIGURE 1 is a perspective view of one embodiment of a hidden fastener constructed according to the present invention.
Figure 2:
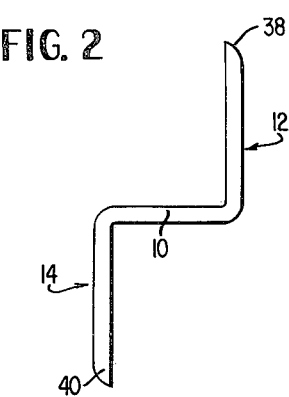
FIGURE 2 is a side elevation of the hidden fastener of FIGURE 1.

Referring to FIGURES 1 and 2, there is shown a hidden type fastener consisting of a sheet metal base 10 and two groups of teeth 12 and 14 extending from the edges thereof. The teeth 12 are formed as three separate teeth 16, 18 and 20, the outer teeth 16 and 20 being separated from the center tooth 18 by means of slits 22 and 24. The center tooth 18 is chisel pointed as shown at 26 while the outer teeth 16 and 20 are scarf pointed as shown at 28 and 30. Similar teeth 32, 34 and 36 are bent downwardly from the other edge of the base plate 10 so that the two groups of teeth 12 and 14 extend in opposite directions.

The teeth 12 and 14 are blanked from a sheet of metal lying in the plane of the base plate 10 in such a manner that the edges of the teeth which are struck downwardly have a slight bevel at the point as shown at 38 and 40 in FIGURE 2. This is due to the fact that the surface of the tooth struck by the punch take substantially the dimension of the punch while the surface of the tooth in engagement with the die take substantially the larger dimension of the die.

These hidden fasteners are intended for application on the site by the carpenter hammering in the lower teeth 14 by striking the base plate 10 with a hammer or suitable driving machine. That is to say, it will be apparent to those skilled in the art that a suitable stapling type machine could be used for the mechanized application of the fastener. After the lower teeth 14 are embedded in the stud, the wall panel may be pressed onto the teeth 12 by hammering with a soft hammer which will not damage the surface finish of the wallboard.

The construction of the fasteners is such that when the teeth are hammered or pressed into the studding and wallboard, a unique three-way clinching action occurs. Thus, referring to FIGURE 3, it will be seen that the center teeth 18 and 34 have moved inwardly in the directions of the arrows while the outer teeth 16, 20, 32 and 36 have moved laterally in the direction of the associated arrows. The movement of the center teeth 18 and 34 is caused by the beveling 38 and 40 which occurs in the stamping, while the lateral movement of the outer teeth is caused by the scarfed ends, the effect of the scarfed ends dominating any tendency of these teeth to move in the direction of the central teeth by reason of the bevelling at the tooth ends. The result is a three-way "tripod" type lock which provides much higher withdrawal resistance than a nail of the same length or two teeth which move apart from one another in the same plane. That is to say, considering the upper teeth 16, 18 and 20, it will be seen that the two outer teeth lie in a common plane, but diverge from one another while the center tooth 18 has moved out of that plane to provide the three directional locking effect. A similar action occurs with the other teeth 32, 34 and 36.

Figure 3:
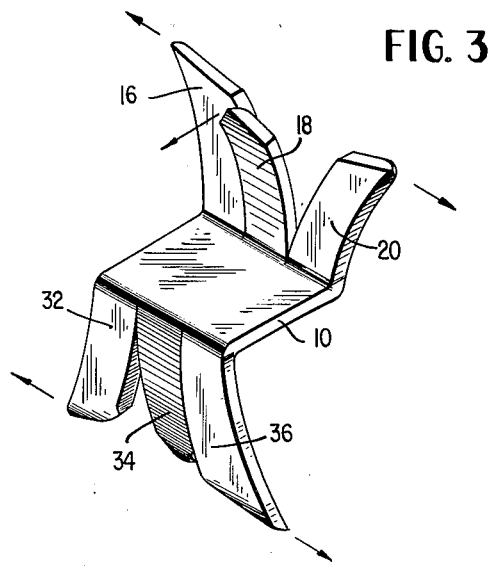
FIGURE 3 is a perspective view of the fastener of FIGURES 1 and 2 showing the teeth thereof in the clinching position assumed when the fastener is driven into the materials to be joined.
Figure 4:
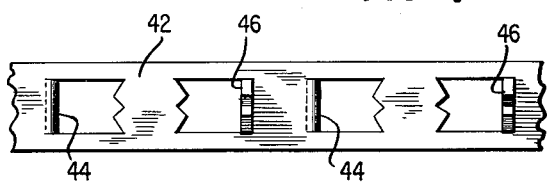
FIGURE 4 is a plan view of a strip type fastener of the general type shown in FIGURES 1 through 3.
Figure 5:
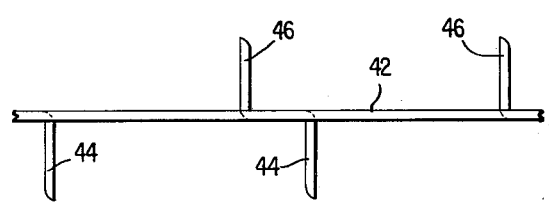
FIGURE 5 is a side elevation of the strip type fastener of FIGURE 4.

Referring to FIGURES 4 and 5, there is shown another embodiment of the invention wherein teeth of the type illustrated in conjunction with the fastener of FIGURES 1 through 3 are provided in a strip of metal 42. Thus, there are seen in FIGURE 5 groups of three downwardly struck teeth 44 and groups of three upwardly struck teeth 46, the shape and action of the teeth being the same as in the embodiment of the invention described in conjunction with FIGURES 1 through 3. Utilizing a strip of this type, the prefabrication of wall paneling to studding and the prefabrication of other structures is considerably simplified and accelerated. In such an operation the strip is simply laid upon the studding, the wallboard is then laid over the strip, and the teeth of the strip are simultaneously pressed into both the wallboard and the studding by means of any suitable press. Stripping of this type is particularly efficacious in the low cost manufacture of box beams, whereby plywood is attached to both surfaces of rectangles of 2 x 4's or similar wood members.

Figure 6:
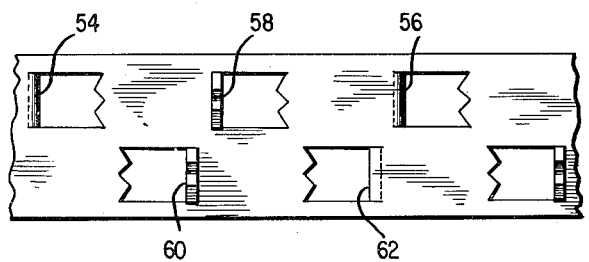
FIGURE 6 is a plan view of another modification of a strip type fastener of the same general type as shown in FIGURES 1 through 3.
Figure 7:
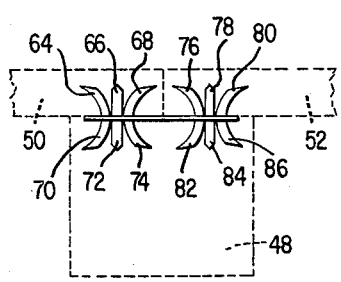
FIGURE 7 is an end elevation of a strip type fastener of the type shown in FIGURE 6, showing the relationship of the fastener to a stud and to wall panels joined thereby.

Referring to FIGURE 6, there is shown another embodiment of the invention which is particularly useful in securing the butted ends of two wallboards to a common stud. Such an association of wooden members is shown in FIGURE 7. Referring to that figure, there is shown a stud 48 and two wallboards 50 and 52. Referring back to FIGURE 6, it will be seen that a first row of groups of three teeth are alternatively struck downwardly at 54 and 56 and upwardly at 58. A second row of groups of three teeth is also struck upwardly at 60 and downwardly at 62. FIGURE 7 is an end view of the plate in FIGURE 6 showing how each row of teeth provides both upwardly extending and downwardly extending teeth for locking into both the stud 48 and the associated wallboards 50 or 52. Thus, one upwardly extending group of teeth 64, 66 and 68 enters the wallboard 50 while a group of downwardly extending teeth 70, 72 and 74 enters the stud 48. Similarly, a group of upwardly extending teeth 76, 78 and 80 enters the wall panel 52 while a group of downwardly extending teeth 82, 84 and 86 enters the stud 48.

Figure 8:
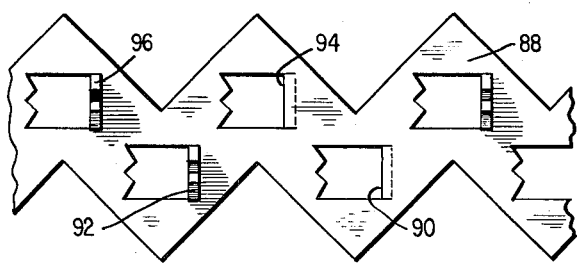
FIGURE 8 is a plan view of a strip type fastener according to another embodiment of the invention.

Referring to FIGURE 8, there is shown another embodiment of a strip type fastener of the same general type as shown in FIGURE 6 which provides for a considerable saving in metal. According to this embodiment of the invention, the strip 88 is provided in zig-zag fashion so as to present two laterally displaced rows of teeth 90 and 92 on the one hand and 94 and 96 on the other. Each row of teeth contains some teeth which are struck upwardly as well as some that are struck downwardly. This plate may be used in the same manner of the plate of FIGURE 6 to provide for butt joint connection of the wall panels to a stud as shown in FIGURE 7.

Figure 9:
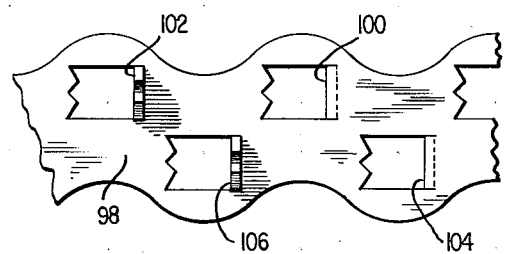
FIGURE 9 is a plan view of a strip type fastener according to still a further embodiment of the invention.

FIGURE 9 shows another variation of the type plate shown in FIGURE 8 wherein the strip 98 is sinuous in character and presents two laterally spaced rows of teeth consisting of tooth groups 100 and 102 on the one hand and 104 and 106 on the other. In both of the strip fasteners of FIGURES 8 and 9, each row of teeth has alternate teeth extending upwardly and downwardly to provide for connection between each wall panel and the stud as illustrated in FIGURE 7.

Figure 10:
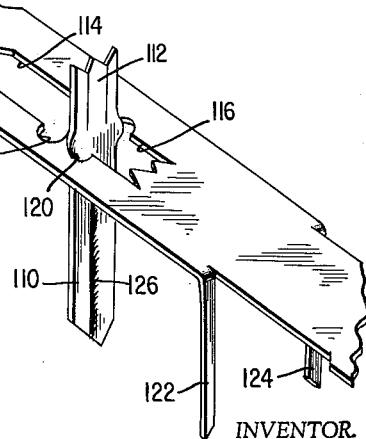
FIGURE 10 is a perspective view of still a further embodiment of a strip type fastener constructed according to the invention.

Referring to FIGURE 10 there is shown another embodiment of a fastener constructed according to the invention which is particularly adapted to the connection of wall panels to studs in a prefabricating operation, wherein entire wall sections may be formed by pressing methods. According to this embodiment of the invention, a strip of sheet metal 108 has a series of slender elongated nail-like teeth 110 extending from one side of the strip 108 and groups of three teeth 112 of the type previously described extending from the other surface of the strip. The striking of the elongated teeth 110 and groups of teeth 112 from the strip leaves slots 114 and 116 which have the same shape as the teeth struck therefrom. However, immediately adjacent the point of connection of the teeth to the strip, the slots are provided with widened portions 118 and 120 which permits the metal at this point to twist so that the oppositely extending groups of teeth and the elongated teeth may lie in a straight line or column for better transmission of load both during the fastener insertion operation and after the wall panel is mounted on the stud. In effect, the composite nails 110–112 are spun around this twisted metal so that the fastener may be inserted in the studs and wallboard by pressure on either or both with the pressure being transmitted directly through the in-line teeth or nails 110–112.

In order to facilitate the setting up of such a prefabricated assembly for pressing, the strip 108 has further slender elongated teeth 122 and 124 struck from opposite sides thereof and extending downwardly in the same direction as the elongated teeth 110. These teeth 122 and 124 are preferably pointed and are shown with scarfed ends in FIGURE 10. While these teeth may be the same length as the elongated teeth 110, they are preferably slightly longer.

With a strip of the type shown in FIGURE 10, the strip may be provided in an elongated form which is initially tacked to the studs by slight pressure which will cause the ends of the longer teeth 122 and 124 to imbed themselves in the stud. This holds the strip in position and in a prefabrication type of operation, the wall panel can then be laid over the upstanding groups of teeth 112 for final pressing. In an on-the-site procedure, the strip 108 may be held into position by tapping the nails 122 and 124 into the studs and the wallboard may thereafter be secured by hammering or pressing the wallboard onto the groups of teeth 112. The elongated teeth 110 are made longer than the groups of teeth 112 because the clinching and locking action of the teeth 112 in the wallboard provides higher withdrawal resistance than would an equal length of teeth 110. The teeth 110 are preferably V-shaped in cross section along the center line of the tooth 126. The clinching action of the groups of teeth 112 is similar to that described in conjunction with the fastener illustrated in FIGURES 1 through 3.

It will be apparent from the foregoing that the fasteners of this invention provide for economical attachment of wallboards to studding either in a prefabrication plant or in on-the-site construction procedures. The unique clinching action provides an excellent joint strength between the fasteners and the wallboard on the one hand and between the wallboard and the studs on the other. In the embodiment of the invention in FIGURE 10, an equally strong attachment is provided between the fastener and the studding by means of the slender elongated teeth 110. The fasteners of the invention may be economically manufactured and applied and, while particularly adapted to fastening the wallboard to studding, are also useful in a variety of other environments calling for the formation of lap joints.

The invention my be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changs which come within the meaning and range of equivalency of the claims are therefore intended to be embraced therein.

What is claimed and desired to be secured by United States Letters Patent is:

1. A joint comprising: a thin wall board; a supporting stud positioned adjacent to the wall board; the stud being of greater thickness than the wall board, and connected to the wall board by a hidden fastener comprising a strip of metal having a pair of substantially parallel surfaces defining opposite sides of a plate, a plurality of tooth means struck from the plate leaving slots therein extending away from the point of attachment of the tooth means to the plate, each of the tooth means having a first portion on one side of the plate and a second portion on the other side of the plate, the first portions extending outwardly from one of the plate surfaces, the second portions extending outwardly from the other of the plate surfaces, the longitudinal axes of the first and second portions of the tooth means being generally colinear and generally normal to the plate surfaces, the first and second portions defining a continuous elongated structure, the first portion thereof being inserted into the wall board and comprising a group of three teeth immediately adjacent one another including two outer teeth and a center tooth, the outer teeth having inclined surfaces non-symmetrical relative to their own longitudinal axes, and the center tooth having inclined surfaces which are symmetrical relative to the longitudinal axes thereof, the inclined surfaces being such that insertion of the teeth into the wall board causes the teeth to depart from substantially normal relationship with the surface of the plate to create a three-way clinching action in the wall board, and the second tooth means comprising a single nail-like tooth inserted into the adjacent portion of the supporting stud.

2. The joint as set forth in claim 1 wherein the fastener includes further tooth means struck from the strip and extending in the same direction as the second portion of the first-named tooth means leaving slots in the plate generally parallel to the slots left by the first-named tooth means, and being at least as long as the second portion of the first-named tooth means.

3. A fastener for forming lap joints wherein the fastener is sandwiched between the members of the joint comprising a sheet metal plate in the form of an elongated strip, first tooth means comprising a plurality of groups of three substantially parallel teeth immediately adjacent to one another struck from the plate to leave a single slot and extending substantially perpendicular thereto, the ends of the teeth having inclined surfaces such that movement of the teeth into one of the members causes the teeth to depart from the substantially perpendicular relationship to the plate and to create a three-way clinching action in the member, the inclined surfaces being beveled at the ends of the teeth, the inclined surface on each tooth of the outermost teeth of the first tooth means being non-symmetrical relative to the longitudinal axis of that tooth, the center tooth in each of the first tooth means having inclined surfaces which are symmetrical relative to the longitudinal axis of the center tooth, and a second tooth means struck from the plate in a direction opposite to that of the first tooth means, the second tooth means being adapted to be embedded in the other of the members of the joint.

4. A fastener as set out in claim 3 wherein the outermost teeth are longer on their outermost edges than on their inner edges and the center tooth has an equilateral triangular point.

5. A fastener as set out in claim 3 wherein the teeth of the second tooth means are in groups of three and are arranged and disposed in the same manner as the teeth in the first tooth means.

6. A fastener as set out in claim 3 wherein the first and second tooth means have colinear central longitudinal axes substantially perpendicular to the plate, and wherein the second tooth means comprise a single nail-like tooth longer than the teeth in the first tooth means.

7. A fastener as set out in claim 3 wherein the strip is of sinuous configuration, and wherein the groups of teeth in the first tooth means are arranged in a pair of substantially parallel spaced rows, and the teeth of the second tooth means lie in the same rows and where the tooth means in one of the rows lies substantially at one set of peaks of the sinuous configuration, and the tooth means in the other of the rows lies substantially at the other set of peaks of the sinuous configuration.

References Cited by the Examiner

UNITED STATES PATENTS

| | | | |
|---|---|---|---|
| 366,844 | 7/1887 | Joyce | 85—13 |
| 705,626 | 7/1902 | Vogel | 85—11 |
| 826,125 | 7/1906 | Steinmetz | 85—13 |
| 1,025,799 | 5/1912 | Fulenwider | 85—13 |
| 1,036,229 | 8/1912 | Harrild | 85—14 |
| 1,089,878 | 3/1914 | Steinhauser | 85—11 |
| 1,470,251 | 10/1923 | Ahlvin | 85—13 |
| 2,620,705 | 12/1952 | Podvinecz | 85—13 |
| 2,885,749 | 5/1959 | Jureit | 85—13 |
| 3,049,042 | 8/1962 | De Lynn | 20—92 |
| 3,094,748 | 6/1963 | Sanford | 20—92 |

FOREIGN PATENTS

| | | |
|---|---|---|
| 529,293 | 1954 | Belgium. |
| 790,800 | 1935 | France. |
| 63,390 | 1892 | Germany. |
| 853,960 | 1952 | Germany. |
| 128,561 | 1919 | Great Britain. |
| 301,713 | 1928 | Great Britain. |
| 354,828 | 1931 | Great Britain. |

RICHARD W. COOKE, JR., *Primary Examiner.*

JACOB L. NACKENOFF, FRANK L. ABBOTT,
*Examiners.*

J. E. MURTAGH, *Assistant Examiner.*